US008787959B2

(12) United States Patent
Hofbauer et al.

(10) Patent No.: US 8,787,959 B2
(45) Date of Patent: Jul. 22, 2014

(54) METHOD OF CONTROLLING A BROADCAST CALL

(75) Inventors: Klaus Hofbauer, Weil der Stadt (DE); Eckart Pargmann, Hemmingen (DE); Reinhard Siegfarth, Leonberg (DE)

(73) Assignee: Alcatel Lucent, Boulogne Billancourt (FR)

( * ) Notice: Subject to any disclaimer, the term of this patent is extended or adjusted under 35 U.S.C. 154(b) by 1629 days.

(21) Appl. No.: 11/564,116

(22) Filed: Nov. 28, 2006

(65) Prior Publication Data

US 2007/0123288 A1 May 31, 2007

(30) Foreign Application Priority Data

Nov. 30, 2005 (EP) ...................... 05292543

(51) Int. Cl.
*H04B 7/00* (2006.01)
(52) U.S. Cl.
USPC ......................................... 455/518
(58) Field of Classification Search
USPC ......................................... 455/518
See application file for complete search history.

(56) References Cited

U.S. PATENT DOCUMENTS

| 6,021,177 | A | 2/2000 | Allport |
| 6,636,522 | B1* | 10/2003 | Perinpanathan et al. ..... 370/409 |
| 6,694,132 | B1* | 2/2004 | Lausi ......................... 455/404.1 |
| 2001/0028310 | A1 | 10/2001 | Tuttle |
| 2002/0183052 | A1* | 12/2002 | Tachikawa ................. 455/422 |
| 2003/0153321 | A1* | 8/2003 | Glass et al. ................. 455/450 |

FOREIGN PATENT DOCUMENTS

EP 1 087 598 A2 3/2001

OTHER PUBLICATIONS

R. Ravi, Rapid rumor ramification: approximating the minimum broadcast time, Foundations of Computer Science, 1994 Proceedings., 35$^{th}$ Annual Symposium on Santa Fe, NM, USA Nov. 20-22, 1994, Los Alamitos, CA Nov. 20, 1994, pp. 202-213, XP010125257.

(Continued)

*Primary Examiner* — Ankur Jain
(74) *Attorney, Agent, or Firm* — Harness, Dickey & Pierce, P.L.C.

(57) ABSTRACT

The invention concerns a method of controlling a broadcast call in a telecommunications network (30) and a broadcast call control system (2). The telecommunications network (30) comprises switching units (214 to 220) for providing telephone connections to subscribers (221 to 230) of the telecommunications network (30). First, a broadcast call is triggered by one of one or more trigger servers (210, 211, 2101 to 2151) of a broadcast call control system (2) operating in parallel to the telecommunications network (30). This includes specifying data identifying a group of subscribers (221 to 230) of the telecommunications network (30) to be reached by the broadcast call and an announcement to be made to the group of subscribers (221 to 230) in the broadcast call. Then, a connection setup to each subscriber of the group of subscribers (221 to 230) in a cascade is requested and the announcement is replayed to each subscriber (221 to 230) a connection has been established to.

17 Claims, 4 Drawing Sheets

(56) References Cited

OTHER PUBLICATIONS

G. Bogler et al, TMN in the Internet Age: Network Management by Multiparty Cooperation, ISS '97. World Telecommunications Congress. (International Switching Symposium). Global Network Evolution: Convergence or Collision? Toronto, Sep. 21-26, 1997, ISS. World Telecommunications—International Switching Symposium, Toronto, vol. 2, Sep. 21, 1997, pp. 603-609, XP000704517.

Mizuno et al, "Advanced Intelligent Network and the Internet Combination Service and its Customization", IEICE Transactions on Communications, Communications Society, Tokyo, Japan, vol. E81-B, No. 8 Aug. 1998, pp. 1574-1581, XP000788463.

Biklien Hoang et al, "Intelligent Internet—Convergence of internet and intelligent network", Intelligent Network Workshop, 2000. Proceedings. 2000 IEEE, May 7-11, 2000, Picataway, NJ, USA, May 7, 2000, pp. 1-11, XP010511158.

* cited by examiner

Fig. 4

METHOD OF CONTROLLING A BROADCAST CALL

TECHNICAL FIELD

The invention relates to a method of controlling a broadcast call and a broadcast call control system.

The invention is based on a priority application, EP 05292543.5, which is hereby incorporated by reference.

BACKGROUND OF THE INVENTION

Although particularly well-suited to warn and alarm a very high percentage of a population, siren networks are often reduced because of financial considerations. Instead, authorities tend to use already existing broadcast means like radio and TV for disaster information dissemination. To reach most of a population all over an area or state, there is need for an efficient and modern "wake-up" means to alert and request people to switch on a media receiver for further information.

There are solutions based on different technologies like Cell Broadcast in mobile networks or alarm clocks triggered by a centrally broadcast longwave time reference signal such as the DCF77 signal in Germany. In fact, conventional radio controlled clocks can be adapted by means of new software to receive alarm signals and to emit an optical and/or acoustic alert.

After all, fixed telephone networks are highly capable to fulfil this task because almost a hundred percent of all people in developed countries possess a connection to a fixed telephone network. While the above mentioned solutions may be restricted by a temporally limited availability or a limited spread of these technologies, a fixed telephone networks solution can easily provide an alarm to a geographically defined subscriber group such as the neighbourhood of a leaking chemical plant. Also in case of power down, a fixed telephone networks solution has a greater robustness than other solutions. Moreover, fixed line telephone extensions usually are not switched off and thus guarantee a 24 hour availability.

Existing solutions for broadcast calls over fixed telephone networks either have a long dissemination time or the network will run the risk of overload. Also, the flexibility to define every possible subscriber grouping is not given in these solutions.

It is the object of the present invention to provide an improved broadcast call system.

The object of the present invention is achieved by a method of controlling a broadcast call in a telecommunications network comprising switching units for providing telephone connections to subscribers of the telecommunications network, whereby the method comprises the steps of triggering, by one of one or more trigger servers of a broadcast call control system operating in parallel to the telecommunications network, a broadcast call by specifying data identifying a group of subscribers of the telecommunications network to be reached by the broadcast call and an announcement to be made to the group of subscribers in the broadcast call, requesting a connection setup to each subscriber of the group of subscribers in a cascade, and replaying the announcement to each subscriber a connection has been established to. Further, the object of the present invention is achieved by a broadcast call control system for controlling a broadcast call in a telecommunications network comprising switching units for providing telephone connections to subscribers of the telecommunications network, whereby the broadcast call control system is adapted to operate in parallel to the telecommunications network, and whereby the broadcast call control system comprises one or more trigger servers adapted to trigger a broadcast call by specifying data identifying a group of subscribers of the telecommunications network to be reached by the broadcast call and an announcement to be made to the group of subscribers in the broadcast call, request a connection setup to each subscriber of the group of subscribers in a cascade, and initiate the replaying of the announcement to each subscriber a connection has been established to.

SUMMARY OF THE INVENTION

The present invention is adapted to reach in worst case all connected subscribers of a fixed line telephony network within a relatively short time span, e.g., within fifteen minutes, without destabilisation of the system.

Moreover, it is possible to define specific subgroups of subscribers. The present invention represents a one-point-to-multipoint distribution system of recorded announcements for voice subscribers with the flexibility of 1 to n subscribers in each possible grouping structure, whereby n denotes the maximum number of possible subscribers. Thus, it is possible to address only one or two target subscribers of a telecommunications network. But it is also possible to address all subscribers of a telecommunications network. Of course, it is also possible to address any deliberately chosen number of subscribers of a telecommunications network.

The mentioned one-point-to-multipoint distribution service may be used as a portal for the selective allocation of information such as for an electric power provider in the case of current breaking, a gas provider in the case of leakage, a municipality concerning water supply, a vendor wishing to distribute commercial information, or an organizer providing a schedule.

Furthermore, the switching system does only the execution of the broadcast call in an optimized manner. All complicated controlling and flow control functions are done "outside", i.e., independently from the switching system. The processing architecture is split between the traditional switching systems and an outside controlling platform. The resulting robustness of the system prevents overload situations.

Due to the separation of the controlling platform from the switching and communication platform, the controlling platform according to the present invention can easily be reused in a NGN environment.

With this approach, the controlling function is flexible enough to apply also less critical broadcast call functions such as commercial, marketing or general group specific information distribution.

Further advantages are achieved by the embodiments of the invention indicated by the dependent claims.

According to a preferred embodiment of the invention, a trigger server at a higher level of said cascade, e.g., a so-called central server, receives broadcast call data from a trigger server located at an operator station. The broadcast call data comprise data about the targeted group of subscribers. Then, the central server retrieves information about telephone numbers associated with the group of subscribers from a database, e.g., a subscriber database. Then, the central server divides the telephone numbers retrieved from the database into appropriate telephone number blocks for distribution to a next lower level of the cascade. Preferably, the central server divides the telephone numbers into blocks of a size which can be processed without problems by the trigger servers of the next lower level.

According to a preferred embodiment of the invention, a trigger server at a lower level of the cascade receives a telephone number block and initiates the generation of corresponding calls to the telephone numbers of the received telephone number block at the switching units associated with the trigger server and able to process the telephone number block. In particular, a trigger servers creates one or more broadcast requests, each broadcast request specifiying a list of one or more subscribers of a group of subscribers. Then, each broadcast request is transmitted to a dedicated switching unit. The switching units receive the broadcast requests via one or more client modules installed into the switching units and establish connections to the subscribers specified in the broadcast requests.

According to another preferred embodiment of the invention, the switching units receive broadcast call data like, e.g., broadcast requests, for establishing connections to subscribers specified in the broadcast requests. Preferably, each switching unit comprises at least one dedicated client module adapted to receive broadcast call data like, e.g., broadcast requests, from a trigger server via an Ethernet interface and distribute broadcast requests to corresponding modules of the switching unit. It is possible that said Ethernet interface establishes a connection between two or more switching units and a trigger server of a next higher level, whereby the Ethernet interface may be connected to each of the one or more client modules of a switching unit.

Preferably, the client modules are adapted to control the functions of the switching units without interfering with the general functionality of the switching units. The invention follows a master-slave architecture. With respect to a broadcast call, the role of the master is taken by the broadcast call control system while the role of the slave is taken by the switching units of the telecommunication network. Particularly, the functions of the switching units (slave) are controlled by the client modules (master) during the processing of a broadcast call. However in the normal working mode, the client modules do not affect the functions of the switching units.

According to another preferred embodiment of the invention, a switching unit, in particular a dedicated client module installed into the switching unit, is adapted to report the current status of the broadcast call back to a trigger server of a higher level of said cascade. Particularly, the client module reports the current status back to a trigger server of the next higher level, e.g., to a so-called control server. The control server aggregates the current status reports of all client modules associated to the control server and reports the aggregated current status back to a trigger server of a next higher level, e.g., to a so-called central server. This way, the trigger servers are adapted to aggregate broadcast call status reports and send the aggregated broadcast call status reports back and up the cascade to a trigger server of the highest level where the broadcast call status can be monitored by an operator.

In a preferred embodiment, the aggregated broadcast call status reports are utilized to identify network elements of the telecommunication network which are under heavy load and other elements of the telecommunication network which are able to take over more jobs. This enables the control system to generate a well-balanced workload over the whole system and control a smooth flow of broadcast requests to the switching units. Therefore, a congestion or overload of the telecommunications network is prevented and the broadcast call can be processed very fast without destabilising the network system.

Preferably, a trigger server is adapted to aggregate the call status reports, initiate a retry broadcast call to subscribers who have not been reached at a first broadcast call and repeat the retry broadcast call until a predefined percentage of connected subscribers has received the broadcast call.

According to another preferred embodiment of the invention, the trigger servers are arranged in a cascade of two or more levels, whereby a trigger server of a certain level is adapted to provide one or more trigger servers of the next lower level with broadcast call data. Therefore, at the highest level operates a first trigger server, preferably assisted by a redundant trigger server adapted to substitute the first trigger server in case of a failure of the first trigger server. One or more trigger servers at a next lower level are adapted to receive broadcast call data and broadcast call instructions from the first trigger server. This cascade architecture is continued down to the lowest level of the cascade.

Preferably, the trigger servers of the broadcast call control system are connected to each other via an IP-based internal network. The IP-based internal network is provided in parallel and independent to the telecommunications network of the subscribers. The IP-based internal network is used to distribute and communicate the control messages related to the broadcast call to the trigger servers of the broadcast call control system.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE INVENTION

Figure 1:
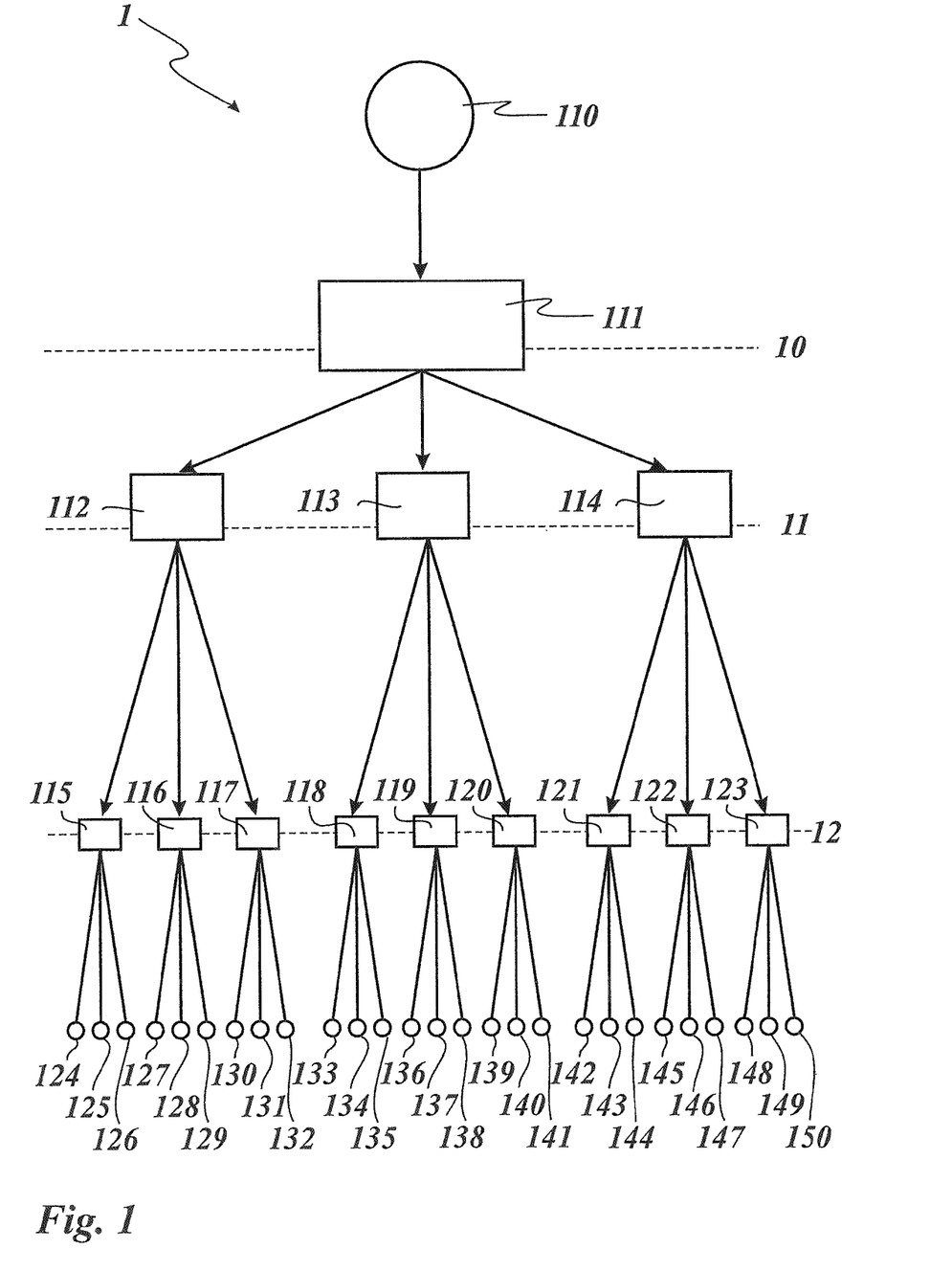
FIG. 1 is a block diagram showing the architecture of the network structure.

FIG. 1 shows a preferred architecture of a broadcast call control system 1. A broadcast call is triggered in a trigger server 110. The trigger signal is transmitted to another trigger server, a so-called central server 111, representing a first level 10 of a distribution cascade. The trigger signal comprises parameters determining the content and the destination points 124 to 150 of the broadcast call. The content of the broadcast call, i.e., the announcement to be made to subscribers of a telecommunication/telephone network, may be determined by a code which specifies a pre-recorded alarm message stored on an audio storage unit. Likewise, the subscribers targeted by the broadcast call may be determined by a code defining, e.g., a specific geographic area of the telephone network.

The central server 111 generates blocks of subscriber telephone numbers, preferably by referring to a subscriber database, and transmits the blocks to dedicated other trigger servers, i.e., so-called control servers 112 to 114 representing a second level 11 of the distribution cascade. Each of the control servers 112 to 114 may be responsible for a different group of subscribers. For example, each control server 112 to 114 may serve the subscribers of a another region or town.

In a preferred embodiment, the central server 111 allocates the blocks of subscriber telephone numbers to the control servers 112 to 114 in such a manner that each of the control servers 112 to 114 is able to smoothly process the allocated blocks. If the central server 111 detects that one of the control servers 112 to 114 is not able to process the allocated load because of problems in the communication lines of the telephone network or because of a power failure, the central server 111 changes and re-allocates the work load to adapt to the new conditions.

The control servers 112 to 114 may analyse the blocks of telephone numbers by regional parameters. Therefore, the control servers 112 to 114 are capable to divide the telephone number blocks according to neighbourhoods and to distribute the divided telephone number blocks to various switching units 115 to 123 representing a third level 12 of the distribution cascade. Each switching unit 115 to 123 may serve the subscribers of a different area or neighbourhood.

Each switching unit 115 to 123 may comprise and/or serve one or more subscriber modules and/or subscriber interface units. It may be possible that the subscriber modules and/or subscriber interface units themselves also possess a switching and/or controlling function, then representing still a lower or the lowest, respectively, level of the distribution cascade. A subscriber module and/or subscriber interface unit may provide connections to single telephone outlets of subscribers.

Then each of the switching units 115 to 123 triggers calls to the multitude of subscribers defined by the divided telephone number blocks. Preferably, the control servers 112 to 114 operate autonomously. Once they have received the data necessary for processing the broadcast call, the control servers 112 to 114 control the further processing of the data independently.

The data of the broadcast call to be made are distributed from the central server 111 from the upper level 10 in a cascade to the lower levels 11, 12. Finally, the broadcast call arrives at the bottom of the cascade, i.e., the subscriber modules and/or subscriber interface units 124 to 150 where the subscriber connections are coupled to.

Each of the trigger servers is constituted of a software platform and application programs executed on the system platform comprising a hardware platform and the aforementioned software platform. The functionalities of the trigger server are performed by the execution of these software components by the hardware components of the trigger server. From a functional point of view, the trigger server comprises at least one receiver module, at least one processing unit, and at least one transmitter module.

Figure 2:
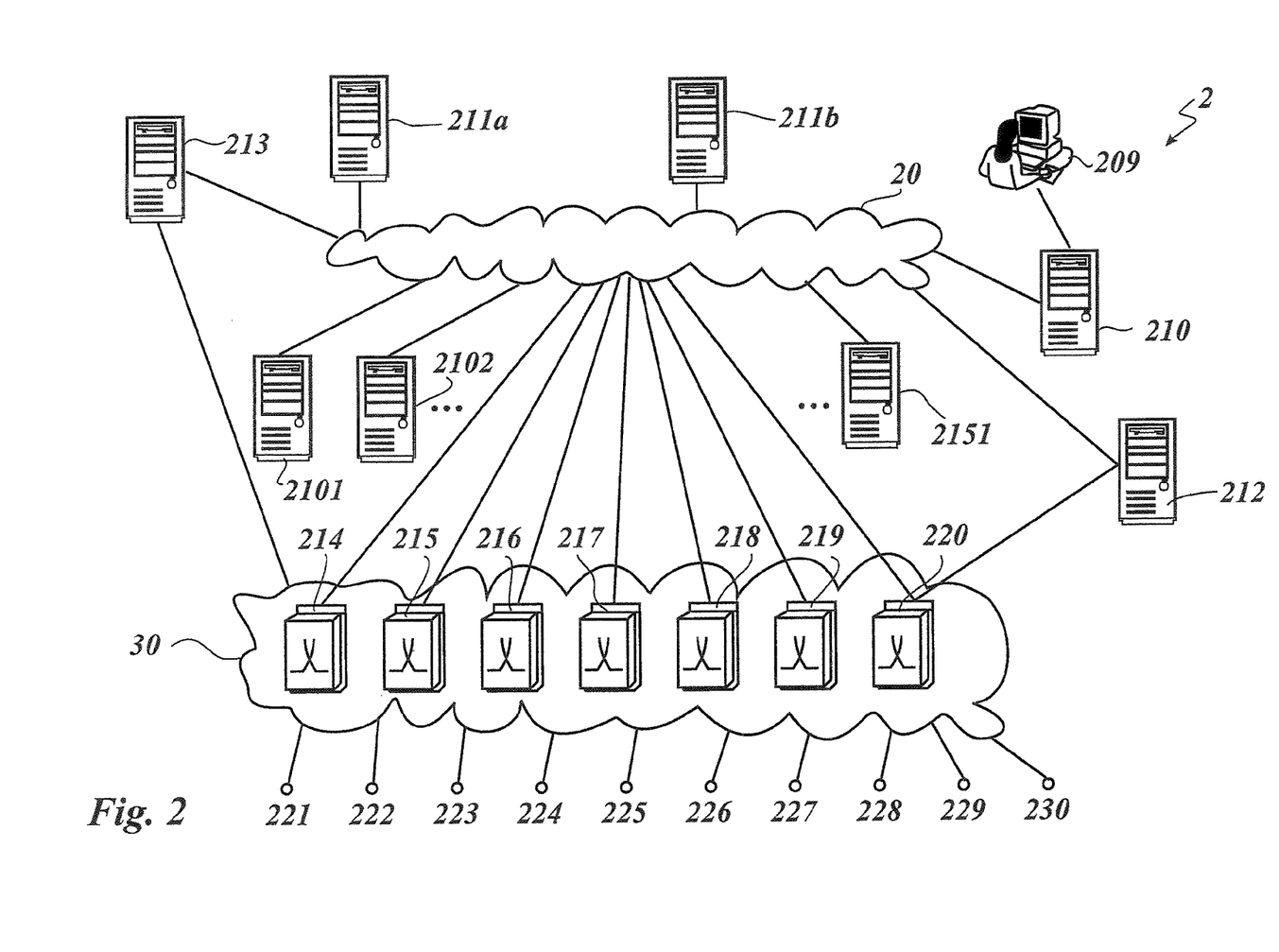
FIG. 2 is a diagram of an embodiment of the network structure.

FIG. 2 shows a preferred embodiment of the invention. The broadcast call control system 2 comprises an IP-based network 20, a first trigger server 210 accessible from an operator station 209, a second trigger server, i.e., a so-called central server 211, a subscriber data server 213, other trigger servers, i.e., so-called control servers 2101 to 2151, a Switch Management Center (=SMC) server 212, and a plurality of switching units 214 to 220 providing switching functions in a telecommunications network 30 such as a PSTN network (IP=Internet Protocol; PSTN=Public Switched Telephone Network).

In a preferred embodiment, the switching units 214 to 220 are voice switches. The central server 211 and the control servers 2101 to 2151 are connected to each other by the IP-based data network 20. In a preferred embodiment, a simultaneous bandwidth of 2 Mbit/s is available to each of the control servers 2101 to 2151.

The first trigger server 210 is utilized to trigger a broadcast call targeted to subscribers 221 to 230 who are connected to the telecommunications network 30 via one of the switching units 214 to 220. The trigger server 210, which may be represented by an operations support system (=OSS), is controlled from an operator station 209. For an authorized operator, it is possible to start the broadcast call in a controlled manner by inputting parameters into the operator station 209, e.g., by means of a keyboard and a microphone. The activation of the broadcast call itself is started via a predetermined procedure such as an authentication of the operator at the operator station 209.

The input parameters are adapted to control the broadcast call, such as limiting the broadcast call to a geographically limited group of subscribers 221 to 230 or other selective group of subscribers 221 to 230. This may be achieved by inputting code numbers associated with one or more telephone exchanges or telephone network area codes. Other input parameters may refer to repetitions of the broadcast call, an alert text, i.e., an audio content of the broadcast call, priority definitions of the broadcast call, etc. With a parameter "alert text", a suitable announcement—preferably prerecorded—may be chosen which is to be transmitted by means of the broadcast call system to the subscribers 221 to 230.

In a preferred embodiment, a subgroup of targeted subscribers is identified by specifying parameters related to a specific feature of the subscribers. For example, to address a subgroup of subscribers living near a specific store, a marketing broadcast call may be issued to a subgroup defined via geographic distribution parameters such as street names or geographic coordinates. Practically, an operator may input street names in a trigger server and a trigger server is adapted to extract all subscribers living in these streets and the corresponding telephone numbers from a data base.

For safety reasons, the first trigger server 210 is designed as two redundant units at two geographically different locations. The trigger server 210 is provided with an interface of sufficient bandwidth to the central server 211 via the IP-based data network 20. Over that interface, all data and messages needed for the initiation and the termination of the broadcast call are sent and received.

For safety reasons, the central server 211 is also designed in a redundant solution at two geographically different locations, each with an independently operating central server 211a, 211b. As large data rates are to be handled, the central servers 211a, 211b are connected to each other, to the subscriber data server 213 and the trigger server, preferably via a LAN or via a WAN with FTP over TCP/IP (LAN=Local Area Network; WAN=Wide Area Network; TCP=Transmission Control Protocol). In a preferred embodiment, both central servers 211a, 211b do not synchronize their data in the time frame between the start and the termination of the broadcast call. If the active central server 211a, 211b fails, the broadcast call has to be re-started from scratch at the other central server 211a, 211b.

The central components of the hardware configuration of the central servers 211a, 211b are designed redundantly. Each of the central servers 211a, 211b has an interface to the trigger server 210, the SMC server 212, the control servers 2101 to 2151, and to the subscriber data server 213. The subscriber data server 213 provides the central server 211 in a defined manner with all necessary current information of the subscribers connected to the switching units 214 to 220.

The control servers 2101 to 2151 comprise, e.g., fifty active servers and one stand-by server for redundancy reasons. Assuming an entirety of 20 million subscribers connected to the telecommunication network 30 and accessible via the switching units 214 to 220, and a capacity of 400,000 subscriber connections per control server 2101 to 2151, this results in a number of fifty control servers 2101 to 2151. Each of the control servers 2101 to 2151 has an interface to the central server 211a and the redundancy central server 211b, to the trigger server 210, to the SMC server 212, and to the switching units 214 to 220 allocated to the respective control server 211. Moreover, all control servers 211a, 211b are networked with each other with a bandwidth of at least 2 Mbit/s. The central components of the hardware configuration of the control servers 211 are designed redundantly.

The SMC server 212 is the centralized element and network manager for the switching units 215 to 220. It enables operators to tailor network operations to best suit their business requirements and processes, and to operate and supervise their switching infrastructures remotely.

Figure 3:
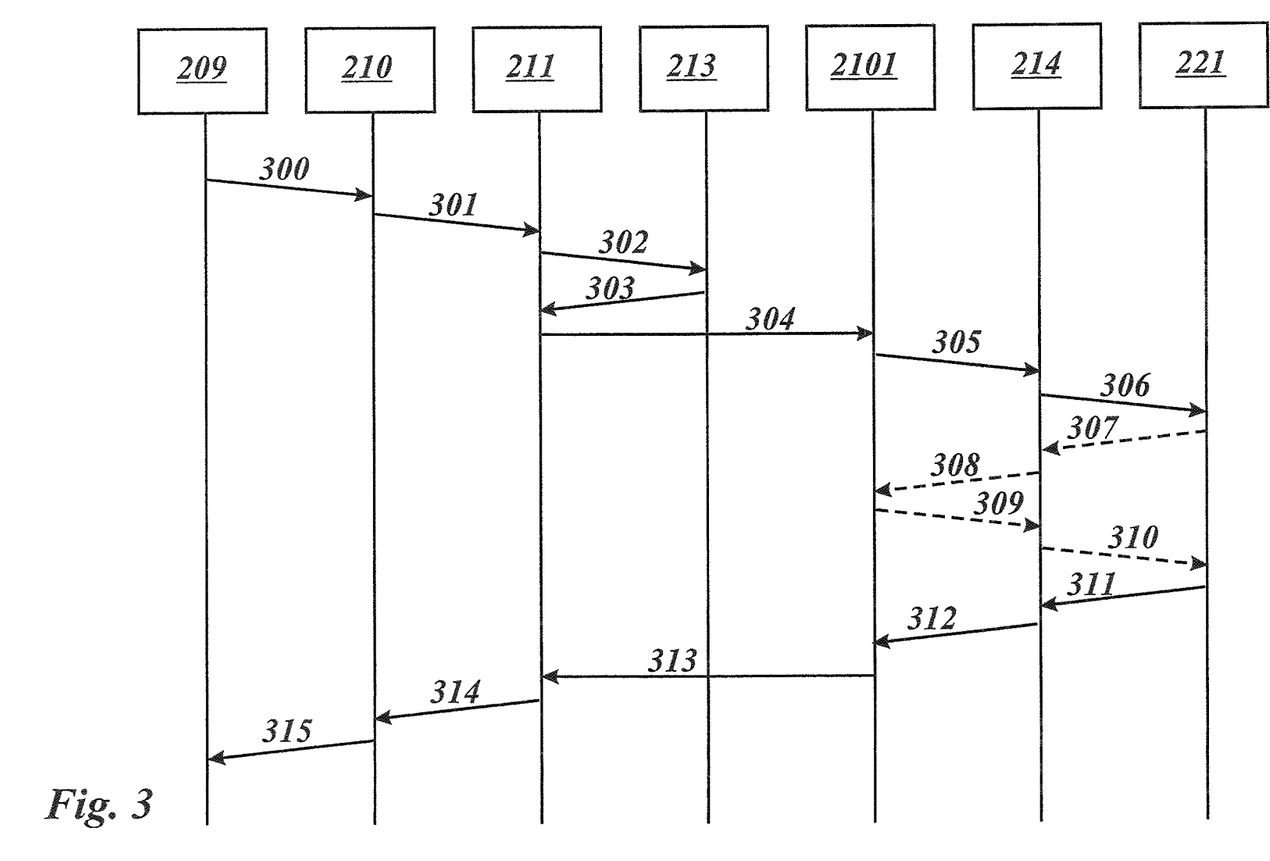
FIG. 3 is a message sequence chart showing the communication among the elements of the broadcast control system and the telecommunications system

FIG. 3 gives a message sequence chart of communications 300 to 315 among elements of the broadcast call system and elements of the telecommunications network according to FIG. 2 in an exemplary broadcast call. An operator logs in at the operator station 209, proves his identity and is requested to input parameters which specify the group of subscribers to be reached by the broadcast call and the announcement to be replayed to each subscriber of the group.

Other input parameters may specify the priority assigned to the broadcast call. A high priority might be assigned to a broadcast call in the case of an emergency while a broadcast call with commercial or marketing background may be assigned a low priority. According to the priority assigned to the broadcast call, the broadcast call may be processed very fast or step by step at times with low traffic on the telecommunications network.

For example, an emergency broadcast call is intended to warn as many people as possible in a very short time span, e.g., all subscribers in less than fifteen minutes. However, a marketing broadcast call may be intended not to cause high load to the telecommunications network and not to disturb the target subscribers at inconvenient times in order not to provoke any resentments. For this purpose, the broadcast call will be placed in low traffic times such as 10-12 am and 3-5 pm. The marketing call will never interfere with or limit the establishment of normal connections. Therefore, it may be allowed to take several days if needed.

In high priority cases, the broadcast call may interrupt an on-going telecommunication connection and replay the announcement to the subscriber of the connection while not disrupting or releasing the connection. For example, a telecommunications connections between a subscriber A and a subscriber B may be interrupted for the replay of the announcement while the connection between A and B is maintained until the former communication between A and B can be resumed at the end of the announcement. In a preferred embodiment of the invention, even in the case of an emergency an existing communication is not released for good because there is no way to differentiate between priority calls such as calls between rescue units and non-priority calls.

Other input parameters may specify whether and how many times a broadcast call is repeated to a specific subscriber who has not been reached in the first broadcast call. For example, for subscribers whose line is busy or who are not near their phone, the broadcast may be retried.

Still other parameters may specify that the broadcast call may override user-related settings set on a telephone set of a subscriber such as call forwardings, closed user group, etc.

All the parameters are transmitted as broadcast call parameter data 300 from the operator station 209 to the trigger server 210. In a preferred embodiment, the operator station 209 is only a means to provide an interface to the human operator by providing a keyboard and a microphone for input and a monitor for output, e.g. in form of a GUI (=Graphical User Interface). The trigger software runs on the trigger server 210 and the interface to the operator station 209 is controlled by the trigger server 210.

The trigger server 210 transmits the broadcast call parameter data 301 to one central server 211. The central server 211 is adapted to send a request 302 to the subscriber data server 213 in order to retrieve address data associated with the subscribers specified in the broadcast call parameter data. For example, the broadcast call is to be transmitted to the subscribers of a specific town. The corresponding parameter data 301 contain the code of the town. Then the trigger server 210 or the central server 211 may be adapted to map the code to the corresponding telephone area codes and to send the telephone area codes together with the request 302 to the subscriber data server 213. The subscriber data server 213 looks up the corresponding addresses, e.g., telephone numbers, stored in an appropriate database and replies to the request by transmitting the requested addresses as message 303 to the central server 211.

The central server 211 is adapted to generate telephone number blocks from the information provided by the trigger server 210 and the subscriber data server 213. The information provided by the trigger server 210 may comprise code numbers associated with one or more telephone exchanges or telephone network area codes. The information provided by the subscriber data server 213 may comprise subscriber data such as telephone number, name, address, occupation, mobile telephone number, fax number, etc. of subscribers of the PSTN network.

The structure of the telephone number blocks is defined in a way as to facilitate the re-organisation of the telephone number blocks in dependency of their priority, i.e., subscribers which are to be reached first by the broadcast call belong to a common priority group. For example, telephone number with a high priority are head numbers of PBX systems or MSN numbers of ISDN connections, (PBX=Private Branch Exchange; MSN=Multiple Subscriber Number; ISDN=Integrated Services Digital Network).

On the other side, the central server 211 has to determine the telephone numbers which will not receive a call of the broadcast call. These non-covered telephone numbers belong to, e.g., phone boxes, semi-permanent connections, and emergency call telephones.

In another embodiment, e.g., an emergency call to all subscribers of a state, the central server 211 may retrieve all area codes of that state from a database and distribute the area codes in area code blocks to the corresponding control servers. Then, the control servers may retrieve the telephone numbers assigned to each area code from a subscriber database and initiate the generation of broadcast requests to the switching units. Thus, the capability to access a subscriber database may be located in different levels of the cascade.

There may be different computer programs associated with the broadcast call control system and running on one or more of the trigger servers, each of the computer programs intended to control the processing of a broadcast call in a different broadcast call scenario. Depending on one ore more parameters input by the operator or recognized from external conditions, a specific computer program is started.

By relocating these tasks from the exchanges to the central server 211, the complexity and the work load in the control functions of the corresponding subscriber exchanges is reduced.

The central server 211 distributes data 304 which are, e.g., generated from the processed telephone number blocks, as well as announcement related data and broadcast call control related parameters to the control servers 2101. To simplify the flowchart of FIG. 3, only one control server 2101 is shown.

Usually, in case the broadcast call is targeted to a multitude of subscribers, the central server 211 will distribute the broadcast call data to several control servers, depending on the volume of subscriber lines.

Once the control server 2101 has received the address data and the broadcast call control related data from the central server 211, it is adapted to re-distribute the necessary data 305 in an independent process to the corresponding switching unit 214. Again, to simplify the flowchart of FIG. 3, only one switching unit 214 is shown. The control server 2101 is adapted to operate autonomously.

The switching unit 214 is part of the switching system of the telecommunications network. According to the present invention, a dedicated client module (not shown) is added to the switching unit 214 whereby the client module allows to use the switching unit 214 within the context of the broadcast call without disturbing the normal switching mode of the switching unit 214. The switching unit is triggered by means of the client module to establish a connection to a subscriber 221. Usually, a switching unit serves more than one subscriber. However, to simplify the flowchart, only one subscriber 221 is shown to be served by the switching unit 214. After the switching unit 214 has established a connection 306 to the subscriber 221, the client module of the switching unit 214 triggers the switching unit 214 to transmit the announcement associated with the broadcast call if the subscriber hooks off the phone.

In a preferred embodiment, the client module of the switching unit 214 will retrieve data such as a log file 207, 311 comprising information whether the broadcast call has reached the subscriber, i.e., whether the announcement has been replayed to the subscriber. This log file 308, 312 will be forwarded from the switching unit 214 to the control server 2101. The control server 2101 may register the information of the log file and forward the aggregated information 313, 314 from all switching units controlled by the control server 2101 to the central server 211 and the trigger server 210. The operator may be presented this information 315 to be able to get a feedback on the success of the broadcast call, i.e., the percentage of subscribers reached by the broadcast call.

In case the broadcast call was not received by the subscriber 221, e.g., because the subscriber 221 was not at home or did not hook off the phone in time, the control server 2101 may aggregate a list of all subscribers associated to the control server 2101 who were not reached in the first broadcast call. Then, after connections to all subscribers have been established in the original broadcast call, the control server 2101 may initiate a second broadcast call directed only to those subscribers who have not been reached in the original broadcast call.

Therefore, the control server 2101 again sends the necessary data 309 to the corresponding switching unit 214. The switching unit 214 is triggered by the client module to establish a connection 310 to the subscriber 221 for a second time. Once the connection has been set up and the subscriber answers the phone, the client module of the switching unit 214 triggers the switching unit 214 to transmit the announcement associated with the broadcast call.

In case the broadcast call process is terminated before the originally planned broadcast call has been completed, e.g., because the operator detects a false alarm, the central server 211 informs all affected control servers 2101 and deletes all waiting call requests. According to a release procedure, existing but not yet completed alert requests are released within the switching units 214.

Another task of the central server 211 is the consolidation of the log files which are generated in the corresponding control servers 2101. The log files allow to determine how many subscribers have been reached by the broadcast call. The status of a specific subscriber (called and reached, not called, called but not reached, busy line) may also be inquired by means of the log files.

The control server 2101 is connected via an Ethernet access connection with the switching unit 214. For the connection of the control servers 2101 with the switching unit 214 via FTP over TCP/IP, a simultaneous bandwidth of 2 Mbit/s per Ethernet access is provided. The redundancy of the control server functionality is locally implemented in the network. This is achieved by additional hardware.

The present invention is based on the idea that the distribution function and the control function in the case of a broadcast call is allocated to a central server 211. The control function is implemented on the control server 2101 which at the same time provides the interface to the switching unit 214. The control server 2101 is connected via a high-bit rate interface to the switching system, i.e., the switching unit 214, and controls the workload of the switching system.

The control server 2101 is adapted to realize a flexible control of the traffic amount directed to the switching unit 214. The control of the traffic amount responds to unpredictable worst case scenarios, and curbs or increases, respectively, the traffic amount according to the current traffic flow conditions. The amount of data is divided into blocks in accordance with the available switching capacity and is adapted to the number of concurrently possible connections which can be realized with the switching unit 214. To this end, the time of sending the data can be prolonged or shortened. Also the data amount (number of telephone numbers per telephone number block) is variable.

Preferably, the control server 2101 loads the switching unit 214 only with a load the switching unit 214 can securely handle. This helps to avoid overload conditions which bear a high risk of stalling the network completely. In a preferred embodiment, the control server 2101 sends the next block of telephone numbers to the switching unit 214 only if the block previously sent has been completely processed or has been processed to ninety percent to allow for the transmission delay. Preferably, the next block is sent only after a message is received from the client module that the previous telephone number block has been executed.

Preferably, the control server 2101 is adapted to inhibit the set-up of new calls except emergency calls during the time frame of the broadcast call if this option is chosen at the trigger server 210. The corresponding control parameters are transmitted from the control server 2101 to the switching unit 214.

Figure 4:
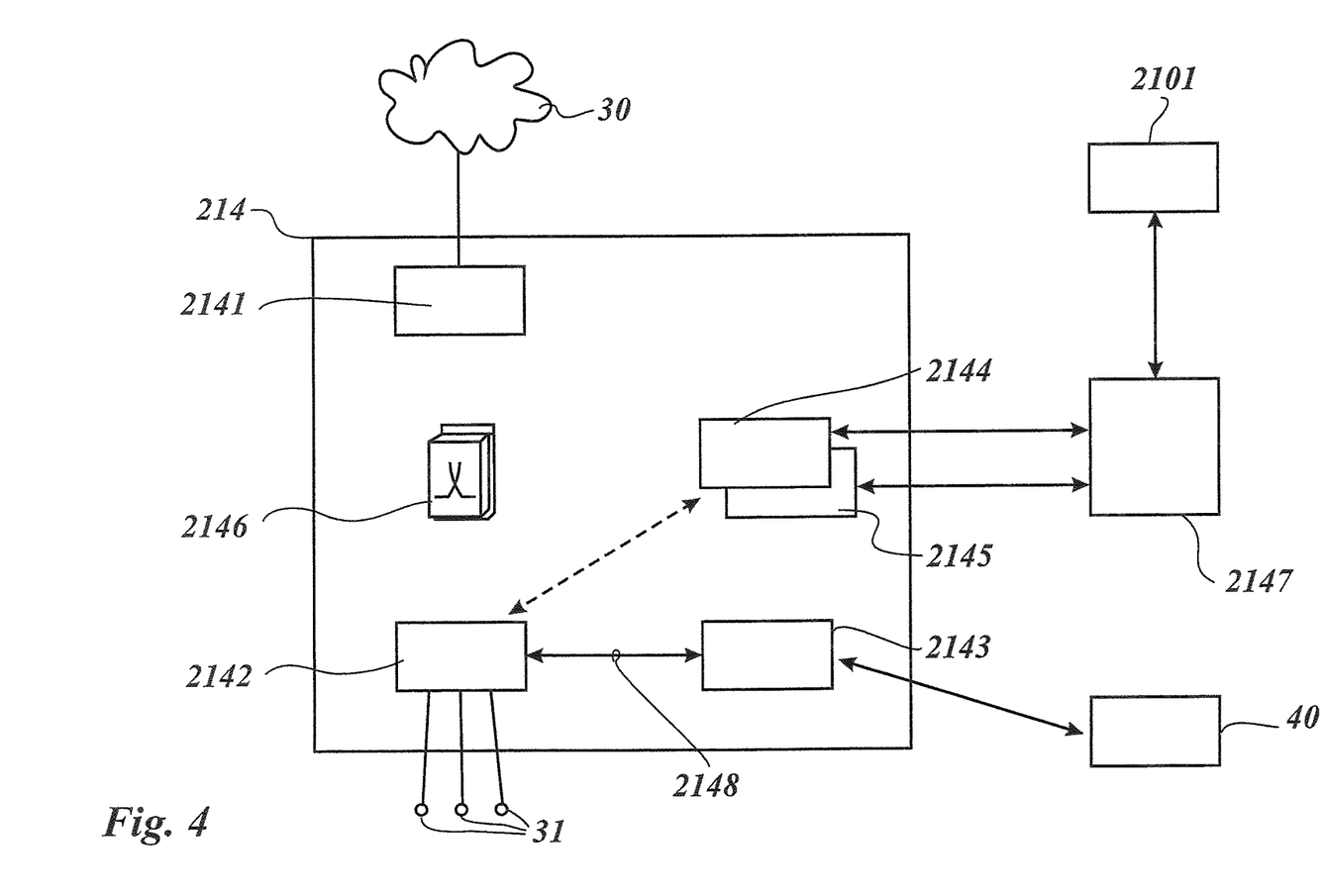
FIG. 4 is a block diagram of a switching unit according to the present invention

FIG. 4 shows a schematic of an embodiment of a switching unit 214 adapted for the present invention. The switching unit 214 is dimensioned for simultaneous connections of at least 10 percent of the subscribers connected to the switching unit 214. According to the present invention, the conventional control functions of the switching unit 214 are kept basically unchanged while extending the functionality of the switching unit 214 with regard to the broadcast call. Aside from connection control functions, also the implemented mechanisms of load limitation and reduction of concurrently possible calls are maintained consistently.

The advantage of this approach is that interactions between newly added functionalities and existing functionalities are kept as small as possible. Thus, the insertion of the broadcast call functionality into the switching unit 214 does not endanger the stability of the network 20. For the broadcast call, the switching unit is not assigned management jobs such as keeping log files etc. Instead, the switching unit is passively waiting for broadcast requests from the broadcast call control platform.

To reach these advantages, one or more dedicated client modules 2144, 2145 mentioned above in the description of FIG. 3 are implemented in the switching unit. Preferably, the client modules 2144, 2145 are high-performance Ethernet Peripheral Modules (=EPM) providing an Ethernet access for the broadcast call and supporting the broadcast call functionality in the switching unit 214 in an optimal way. The client modules 2144, 2145 work in the operation mode "load sharing" and may be installed in appropriate racks. For redundancy reasons one client module 2144, 2145 more than needed (n+1) is installed. The client module hardware may be able to call, e.g., 10,000 subscribers within a time span of about fifteen minutes.

Except the client modules 2144, 2145, the switching unit 214 comprises a trunk module 2141 for connecting the switching unit 214 to the telecommunications network 30, a subscriber module 2142 for connecting the switching unit 214 to subscriber connections 31, a tone and announcement module 2143, and a switched network 2146. The client modules 2144, 2145 are connected to the control server 2101 via an interface 2147, preferably an Ethernet interface. The tone and announcement module 2143 may be controllable via an announcement management and development system 40.

The client modules 2144, 2145 are adapted to execute an "external" communication with the control server 2101 via the interface 2147, preferably via TCP/IP. Preferably, this interface is an already existing interface of the switching units. For example, the interface of the client modules 2144, 2145 to the control server 2101 may be set up via an EPM interface of the switching unit used for telephone billing and management tasks and a physical client interface of the control server.

It is possible that the control server 2101 is adapted to control more than one switching unit via the interface 2147, i.e., that more than one switching units are connected to the interface 2147.

Further, the client modules 2144, 2145 are capable to speed up the execution of all assigned tasks such as forwarding parameters to corresponding modules in the switching unit 214 as well as processing the data received via the interface 2147, the data containing the subscriber connections to be called. The client modules 2144, 2145 process the data received from the control server 2101 until the data stream fades out.

A task of the control server 2101 is to realize a uniform distribution of the telephone numbers of a telephone number block down to the subscriber module 2142 in order to achieve a uniform distribution of the work load over the switching system. This prevents an undesirable accumulation of traffic at specific subscriber modules such as the Remote Interface Module (=RIM) for the switch-on of Remote Subscriber Units (=RSU) and the unnecessary increase of the total alert time.

Further, the control server 2101 is adapted to analyse the log files received from the respective client modules 2144, 2145. The log files ("result files") comprise information on the status of all subscribers who were contained in the call establishment request such as reached, busy, not reached, etc.

Optionally, from the busy lines and not reached lines, respectively, retry call lists can be generated at the end of a "normal" call process. A retry list is started only when each of the original lists has been executed. The distribution of the calls is handled in the same way as the original broadcast call via the client modules 2144, 2145. The control of the retries (repetitions and execution of not yet successful calls) is done simultaneously to the generation of data which have to be transmitted to the client modules 2144, 2145. Default presets in the control server 2101 and inputs from the trigger server 210, respectively, determine how many times a retry has to be executed.

In a preferred embodiment, the broadcast call announcement which is specified by the parameter "alert text" is set in a call bus during the whole call process and cannot be changed during the call process. Preferably, announcements for emergency cases are pre-recorded and kept for use in a store in the switching unit 214 in order to ensure their availability in the urgent case of an emergency broadcast call. Less critical announcements like marketing announcements may be recorded at the operator station 209 and distributed along the control channels to the switching unit 214.

The client modules 2144, 2145 respect any prioritising of subscribers. They control and monitor the called status of all calls. It is to be noted that not the respective currently valid call state, e.g., "calling", is reported back by the client modules 2144, 2145 to the control server 2101, but only the final status after the assignment such as "busy", "no connection—called party does not answer the call", or "no connection—called party was not called".

The client modules 2144, 2145 do not generate communication data sets (CDR=Central Data Repository). The client modules 2144, 2145 do not cause an additional load of the signalling network for the No7 signalling. Also, the client modules 2144, 2145 are adapted to generate result files and to send the result files to the control server 2101.

In a preferred embodiment, the central server 211 and the control server 2101 are integrated into the central processing by means of the SMC 212 which is the centralized element and network manager for the switching units 214 to 220.

The recording/replay of an announcement for broadcast calls of subscribers is technically and economically feasible by means of the tone bus of the switching unit 214 within a narrowly limited time period. The broadcast call announcement is kept in the tone and announcement module 2143 of the switching unit 214. The tone and announcement module 2143 may be realized by means of DIAM modules. The broadcast call announcement can be changed by the provider of the telecommunication network 30 by way of suitable software (DIAM=Dynamic Integrated Announcement Module).

The tone and announcement module 2143 switches the announcement onto a free tone port defined by the provider of the telecommunications network 30. In one embodiment, it is not possible to start the announcement in the moment a subscriber hooks off his telephone, i.e., there is no defined start of the announcement. Therefore, it is recommended to keep the announcement rather short, e.g., less than ten seconds. Alternatively, the announcement will be started in the moment when the subscriber answers the phone and hooks off the phone.

Connections between the tone bus, i.e., the tone and announcement module 2143 and the subscriber connection are established directly via a cluster path 2148, i.e., this type of connections is not lead over the switched network 2146. Thus, the announcement connections are not subject to the limitation of the concurrent traffic which applies to switched networks. Preferably, one or more announcements are pre-recorded, stored in an already tone bus used for dial tones and processed via the already existing tone processing hardware of the switching units.

The invention claimed is:

1. A method of controlling a broadcast call in a telecommunications network comprising switching units for providing telephone connections to subscribers of the telecommunications network, said method comprises:

triggering, by one of one or more trigger servers of a broadcast call control system operating in parallel to the telecommunications network, a broadcast call by specifying data identifying a group of subscribers of the telecommunications network to be reached by the broadcast call and an announcement to be made to the group of subscribers in the broadcast call, the trigger servers being arranged in a cascade of two or more levels such that a trigger server of a certain level is configured to provide one or more trigger servers of a lower level with broadcast call data;

requesting a connection setup to each subscriber of the group of subscribers in a cascade;

creating at one or more of the trigger servers one or more broadcast requests, each broadcast request specifying a list of one or more subscribers of said group of subscribers;

transmitting each broadcast request to a dedicated switching unit, each switching unit including one or more client modules configured to receive broadcast call data from one of the trigger servers via an Ethernet interface of the switching unit and distribute broadcast requests to corresponding modules of the switching unit;

receiving at the switching units via the one or more client modules installed into the switching units said broadcast requests and establishing connections to the subscribers specified in the broadcast requests;

replaying the announcement to each subscriber a connection has been established to;

reporting a current status of the broadcast call back within the cascade;

allocating blocks of subscriber telephone numbers to the trigger servers based on the current status of the broadcast call, the current status being based on whether or not the broadcast call has been received at a subscriber of the group of subscribers; and changing and re-allocating a workload to adapt to new conditions.

2. The method of claim 1, wherein the method comprises the further steps of:

receiving at a higher level of said cascade said data identifying the group of subscribers of the telecommunications network to be reached by the broadcast call and the announcement to be made to the group of subscribers in the broadcast call and retrieving information about telephone numbers associated with the group of subscribers from a database; and dividing at the higher level of said cascade said telephone numbers into telephone number blocks for distribution to a lower level of the cascade.

3. The method of claim 1, wherein the method comprises the further steps of:

receiving at a lower level of the cascade a telephone number block and initiating generation of corresponding calls to the telephone numbers of the received telephone number block at corresponding switching units.

4. The method of claim 1, wherein the method comprises the further steps of:

allocating a well-balanced workload and controlling a smooth flow of broadcast requests to the switching units in dependence of the current status of the broadcast call.

5. The method of claim 1, wherein the method comprises the further steps of:

identifying subscribers who have not been reached at the broadcast call by analyzing the current status of the broadcast call reported back within the cascade;

initiating a retry broadcast call to the identified subscribers; and repeating the retry broadcast call until a predefined percentage of connected subscribers has received the broadcast call.

6. The method of claim 1, wherein the allocating blocks of subscriber telephone numbers step allocates blocks of subscriber telephone numbers to the trigger servers based on a priority of each subscriber in the group of subscribers.

7. The method of claim 1, wherein the allocating blocks of subscriber telephone numbers step allocates blocks of subscriber telephone numbers to the trigger servers based on previously allocated blocks of subscriber telephone numbers and a load associated with the trigger servers.

8. A broadcast call control system for controlling a broadcast call in a telecommunications network including switching units for providing telephone connections to subscribers of the telecommunications network, wherein the broadcast call control system is configured to operate in parallel with the telecommunications network, the broadcast call control system comprises:

one or more trigger servers being arranged in a cascade of two or more levels such that a trigger server of a certain level is configured to, provide one or more trigger servers of a lower level with broadcast call data, trigger a broadcast call by specifying data identifying a group of subscribers of the telecommunications network to be reached by the broadcast call, trigger an announcement to be made to the group of subscribers in the broadcast call, request a connection setup to each subscriber of the group of subscribers in a cascade, report a current status of the broadcast call back within the cascade, initiate replaying of the announcement to each subscriber a connection has been established to, allocate blocks of subscriber telephone numbers to the trigger servers based on the current status of the broadcast call, the current status being based on whether or not the broadcast call has been received at a subscriber of the group of subscribers, change and re-allocate a workload to adapt to new conditions, identify subscribers who have not been reached at the broadcast call by analyzing the current status of the broadcast call reported back within the cascade, initiate a retry broadcast call to the identified subscribers, and repeat the retry broadcast call until a predefined percentage of connected subscribers has received the broadcast call.

9. The broadcast call control system of claim 8, wherein a set of trigger servers are configured to communicate with dedicated client modules, wherein each switching unit includes one or more of said client modules configured to receive broadcast call data from a trigger server via an Ethernet interface of the switching unit and distribute broadcast requests to corresponding modules of the switching unit.

10. The broadcast call control system of claim 8, wherein the trigger servers of the broadcast call control system are connected to each other via an IP-based internal network.

11. The broadcast call control system of claim 8, wherein the one or more trigger servers are further configured to allocate blocks of subscriber telephone numbers to the trigger servers based on a priority of each subscriber in the group of subscribers.

12. The broadcast call control system of claim 8, wherein the one or more trigger servers are further configured to allocate blocks of subscriber telephone numbers to the trigger servers based on previously allocated blocks of subscriber telephone numbers and a load associated with the trigger servers.

13. A method of controlling a broadcast call in a telecommunications network comprising switching units for providing telephone connections to subscribers of the telecommunications network, said method comprises:
- triggering, by one of one or more trigger servers of a broadcast call control system operating in parallel to the telecommunications network, a broadcast call by specifying data identifying a group of subscribers of the telecommunications network to be reached by the broadcast call and an announcement to be made to the group of subscribers in the broadcast call, the trigger servers being arranged in a cascade of two or more levels such that a trigger server of a certain level is configured to provide one or more trigger servers of a lower level with broadcast call data;
- requesting a connection setup to each subscriber of the group of subscribers in a cascade;
- creating at one or more of the trigger servers one or more broadcast requests, each broadcast request specifying a list of one or more subscribers of said group of subscribers;
- transmitting each broadcast request to a dedicated switching unit, each switching unit including one or more client modules configured to receive broadcast call data from one of the trigger servers via an Ethernet interface of the switching unit and distribute broadcast requests to corresponding modules of the switching unit;
- receiving at the switching units via the one or more client modules installed into the switching units said broadcast requests and establishing connections to the subscribers specified in the broadcast requests;
- replaying the announcement to each subscriber a connection has been established to;
- reporting a current status of the broadcast call back within the cascade;
- allocating blocks of subscriber telephone numbers to the trigger servers based on previously allocated blocks of subscriber telephone numbers and a load associated with the trigger servers; and
- one of changing and re-allocating a workload of one or more of the trigger servers based on a change in the load associated with the trigger servers.

14. The method of claim 13, wherein the method comprises the further steps of:
- receiving at a higher level of said cascade said data identifying the group of subscribers of the telecommunications network to be reached by the broadcast call and the announcement to be made to the group of subscribers in the broadcast call and retrieving information about telephone numbers associated with the group of subscribers from a database; and
- dividing at the higher level of said cascade said telephone numbers into telephone number blocks for distribution to a lower level of the cascade.

15. The method of claim 13, wherein the method comprises the further steps of:
- receiving at a lower level of the cascade a telephone number block and initiating generation of corresponding calls to the telephone numbers of the received telephone number block at corresponding switching units.

16. The method of claim 13, wherein the method comprises the further steps of:
- allocating a well-balanced workload and controlling a smooth flow of broadcast requests to the switching units in dependence of the current status of the broadcast call.

17. The method of claim 13, wherein the method comprises the further steps of:
- identifying subscribers who have not been reached at the broadcast call by analyzing the current status of the broadcast call reported back within the cascade;
- initiating a retry broadcast call to the identified subscribers; and
- repeating the retry broadcast call until a predefined percentage of connected subscribers has received the broadcast call.

* * * * *